(12) United States Patent
Kobashi et al.

(10) Patent No.: US 11,604,384 B2
(45) Date of Patent: Mar. 14, 2023

(54) LIQUID CRYSTAL ELEMENT

(71) Applicant: Japan Display Inc., Tokyo (JP)

(72) Inventors: Junji Kobashi, Tokyo (JP); Shinichiro Oka, Tokyo (JP); Yasushi Tomioka, Tokyo (JP); Koichi Igeta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/655,085

(22) Filed: Mar. 16, 2022

(65) Prior Publication Data

US 2022/0299825 A1    Sep. 22, 2022

(30) Foreign Application Priority Data

Mar. 19, 2021 (JP) .............................. JP2021-046120

(51) Int. Cl.
*G02F 1/1337*    (2006.01)
(52) U.S. Cl.
CPC .............................. *G02F 1/133738* (2021.01)
(58) Field of Classification Search
CPC ................................................ G02F 1/133738
See application file for complete search history.

(56) References Cited

U.S. PATENT DOCUMENTS

| 5,311,343 | A  | * | 5/1994  | Katagiri | ................ | G02F 1/1337 |
| | | | | | | 349/134 |
| 2003/0142256 | A1 | * | 7/2003 | Maeda | ................. | G02B 5/3016 |
| | | | | | | 349/115 |
| 2011/0267686 | A1 | | 11/2011 | Kageyama et al. | | |
| 2014/0293436 | A1 | | 10/2014 | Nagahama et al. | | |

FOREIGN PATENT DOCUMENTS

JP    2011-227154 A    11/2011
JP    2013-114073 A    6/2013

* cited by examiner

*Primary Examiner* — James A Dudek
(74) *Attorney, Agent, or Firm* — Maier & Maier, PLLC

(57) ABSTRACT

According to one embodiment, a liquid crystal element includes a transparent substrate including a first main surface, a plurality of structures disposed on the first main surface and arranged along one direction, an alignment film disposed on a surface of each of the structures and a liquid crystal layer containing a cholesteric liquid crystal and in contact with the alignment film, and the helical axis of the cholesteric liquid crystal is inclined with respect to the first main surface, each of the plurality of structures includes a first surface inclined with respect to the first main surface, in the plurality of structures, the first surfaces are parallel to each other, and the alignment film is interposed between the first surface and the liquid crystal layer.

5 Claims, 9 Drawing Sheets

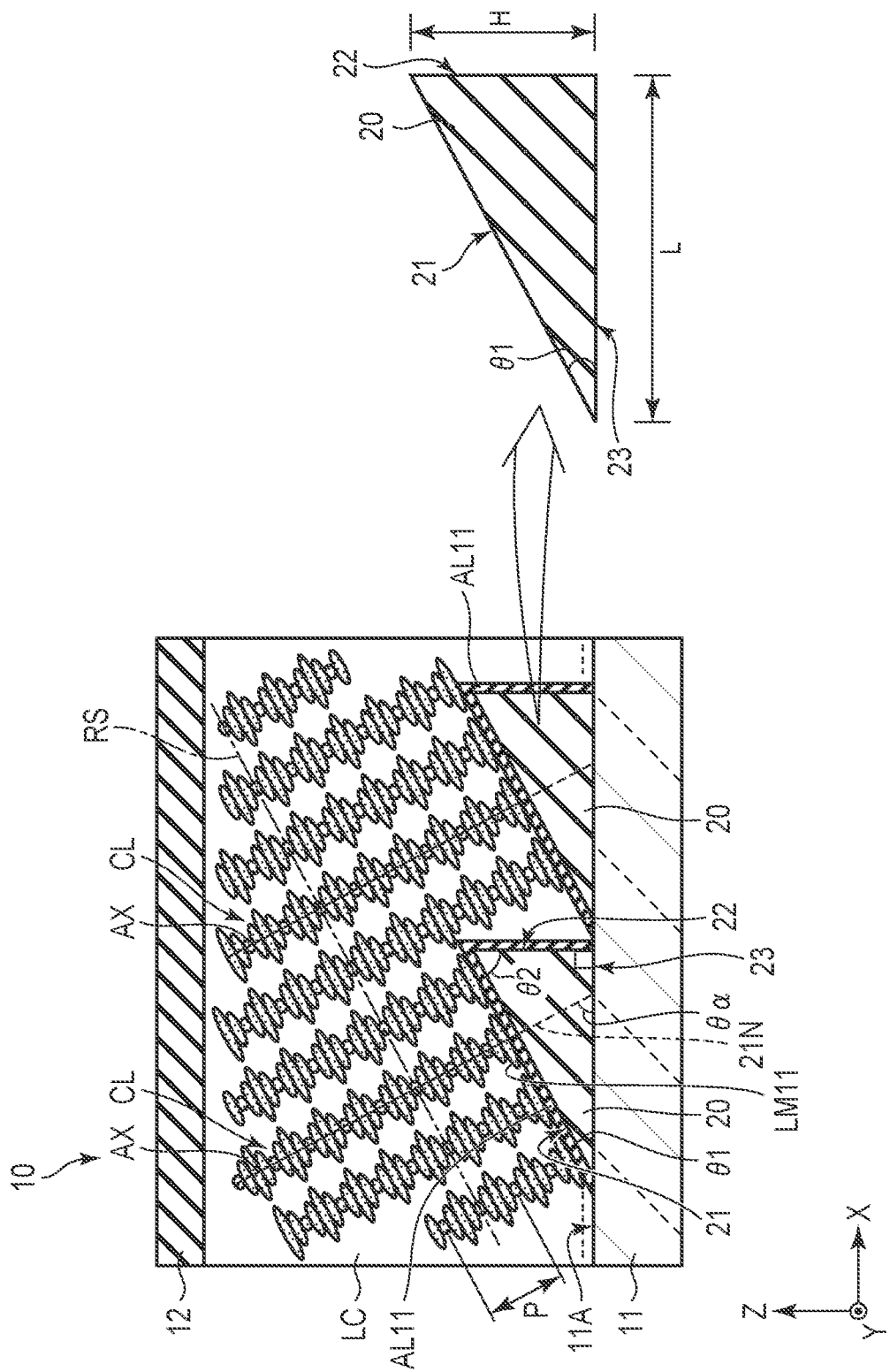
F I G. 3

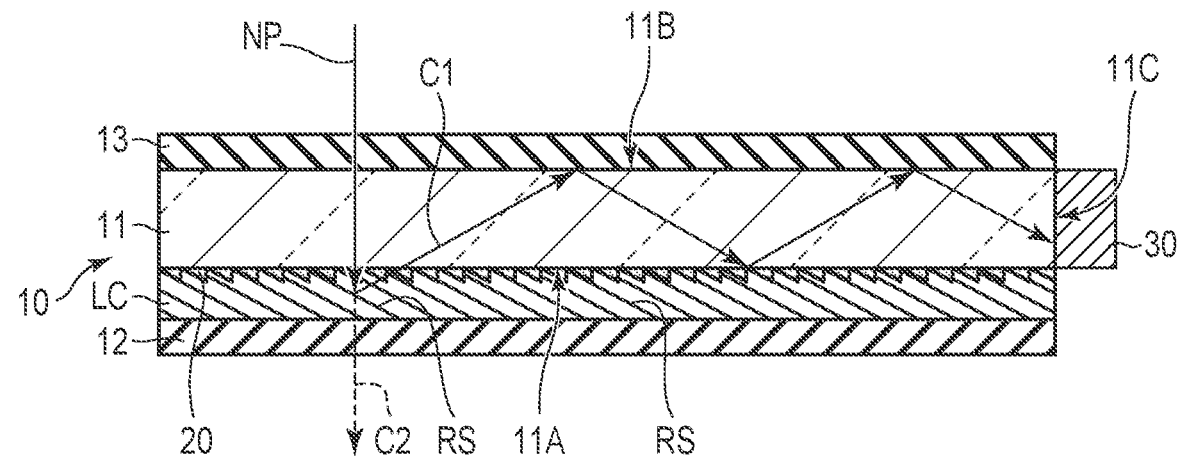
F I G. 11
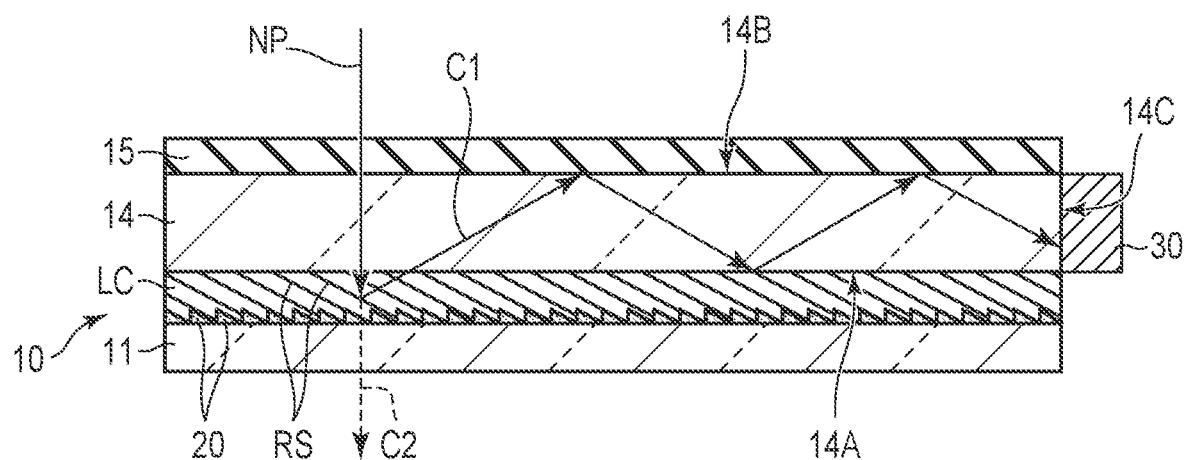
F I G. 12

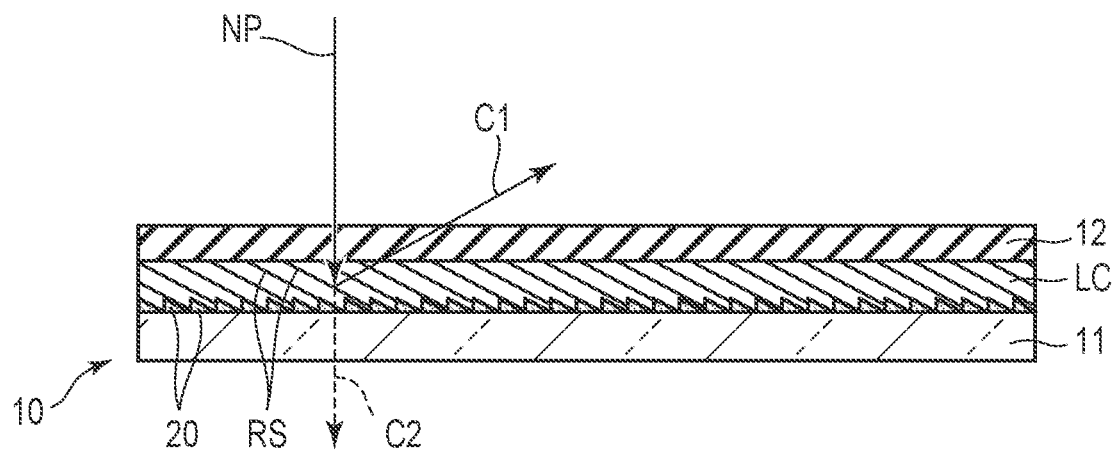
F I G. 13
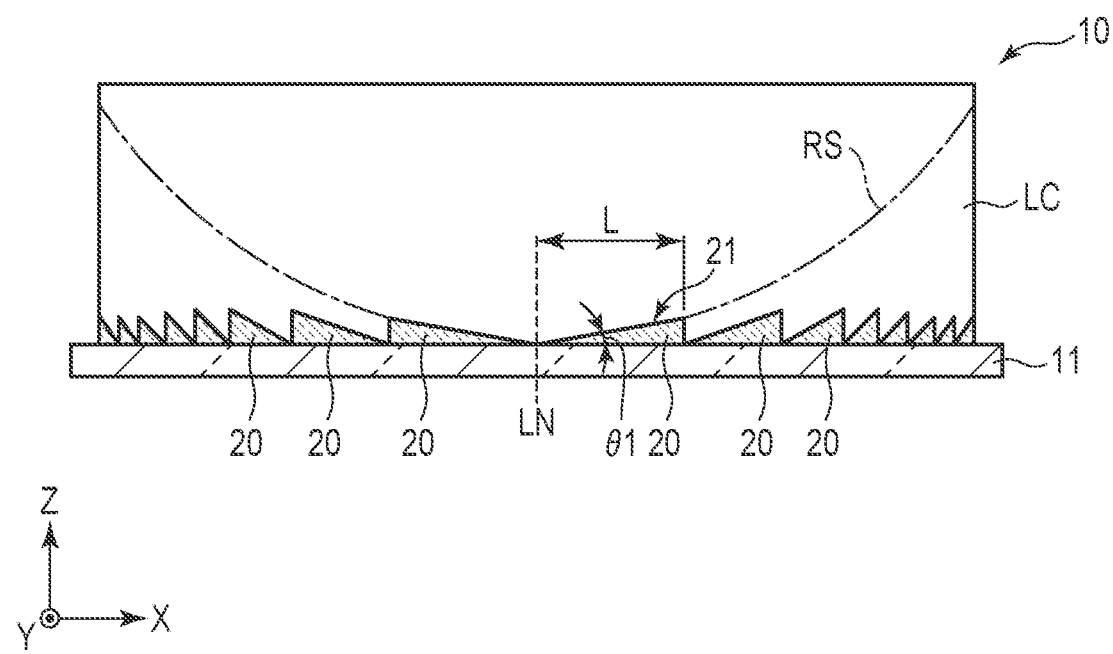
F I G. 14

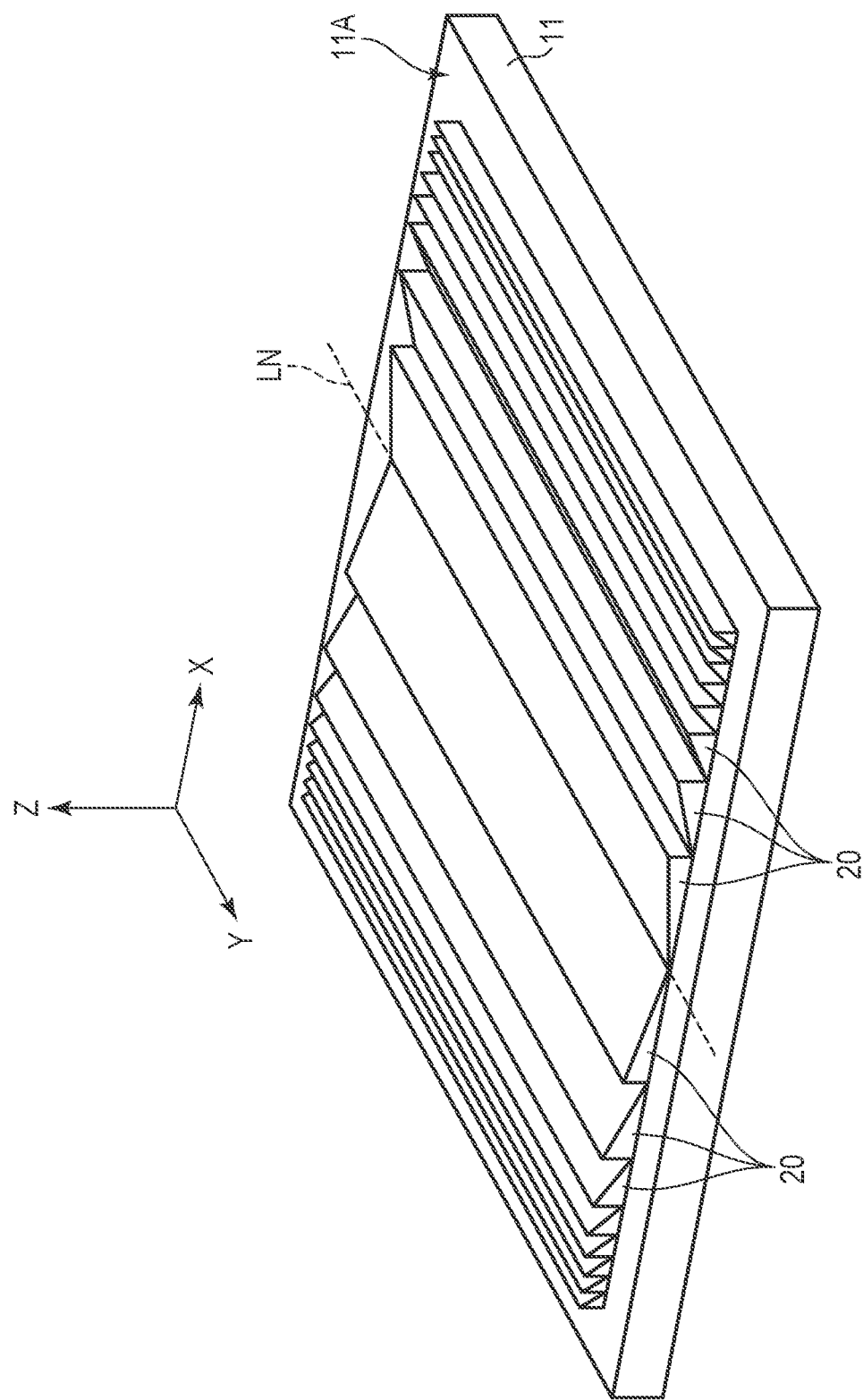
F I G. 15

LIQUID CRYSTAL ELEMENT

CROSS-REFERENCE TO RELATED APPLICATIONS

This application is based upon and claims the benefit of priority from Japanese Patent Application No. 2021-046120 filed on Mar. 19, 2021, the entire contents of which are incorporated herein by reference.

FIELD

Embodiments described herein relate generally to a liquid crystal element.

BACKGROUND

In recent years, various liquid crystal elements which use cholesteric liquid crystals have been proposed. Cholesteric liquid crystals have properties that reflect light of a specific wavelength according to the helical pitch. For example, as a reflective layer on an uneven surface of an optical layer, an optical body to which cholesteric liquid crystals are applied has been proposed.

As a technique for aligning such cholesteric liquid crystals in a predetermined direction and forming a desired phase distribution in a plane, the circularly polarized light interference exposure method which uses an optical alignment agent is known. However, the range in which interference exposure can be done is limited, and therefore it is difficult to obtain a large area thereof.

BRIEF DESCRIPTION OF THE DRAWINGS

FIG. 3 is a cross-sectional view of a configuration example of the liquid crystal element 10.

FIG. 11 is a cross-sectional view showing Example 1 of the liquid crystal element 10.

FIG. 12 is a cross-sectional view showing Example 2 of the liquid crystal element 10.

FIG. 13 is a cross-sectional view showing Example 3 of the liquid crystal element 10.

FIG. 14 is a cross-sectional view showing another example of the liquid crystal element 10.

FIG. 15 is a schematic diagram showing a structure 20 of the liquid crystal element 10 shown in FIG. 14.

DETAILED DESCRIPTION

Figure 1:
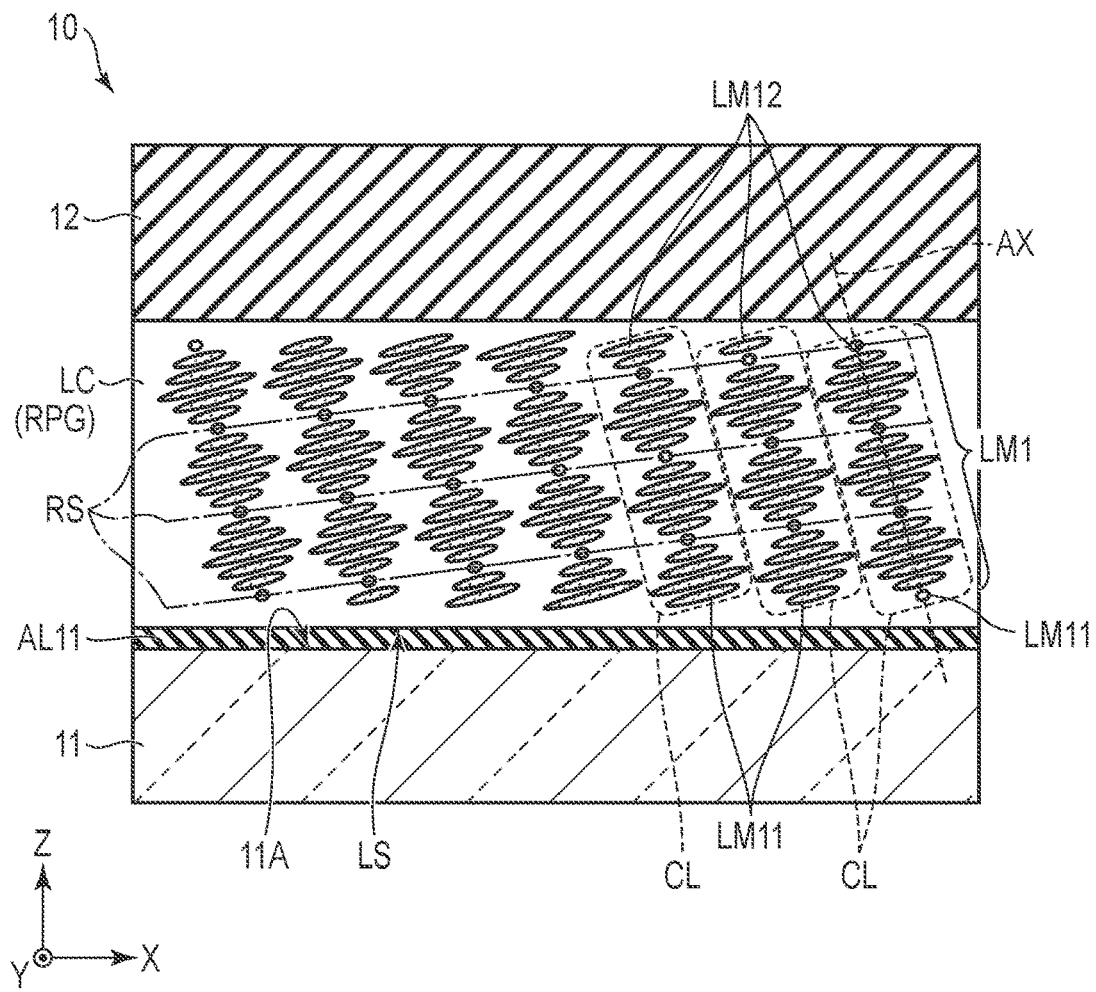
FIG. 1 is a cross-sectional view showing an example of a liquid crystal element 10 according to an embodiment.

An object to the embodiments is to provide a liquid crystal element capable of large area and mass production.

In general, according to one embodiment, a liquid crystal element comprises a transparent substrate including a first main surface, a plurality of structures disposed on the first main surface and arranged along one direction, an alignment film disposed on a surface of each of the structures and a liquid crystal layer containing a cholesteric liquid crystal and in contact with the alignment film, and a helical axis of the cholesteric liquid crystal is inclined with respect to the first main surface, each of the plurality of structures includes a first surface inclined with respect to the first main surface, in the plurality of structures, the first surfaces are parallel to each other, and the alignment film being interposed between the first surface and the liquid crystal layer.

According to another embodiment, a liquid crystal element comprises a transparent substrate including a first main surface, a plurality of structures disposed on the first main surface and arranged along one direction, an alignment film disposed on a surface of each of the structures and a liquid crystal layer containing a cholesteric liquid crystal and in contact with the alignment film, and a helical axis of the cholesteric liquid crystal is inclined with respect to the first main surface, the surface of each of the structures is formed into a form of a staircase, including a first upper surface, a second upper surface of a different height from that of the first upper surface, and a side surface between the first upper surface and the second upper surface, and the alignment film is interposed between the first upper surface and the second upper surface, and the liquid crystal layer.

According to the embodiments, a liquid crystal element which can be enlarged to a larger area and mass-produced can be provided.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof may be omitted unless otherwise necessary.

Note that, in order to make the descriptions more easily understandable, some of the drawings illustrate an X axis, a Y axis and a Z axis orthogonal to each other. A direction along the X axis is referred to as an X direction or a first direction, a direction along the Y axis is referred to as a Y direction or a second direction and direction along the Z axis is referred to as a Z direction or a third direction. A plane defined by the X axis and the Y axis is referred to as an X-Y plane, and a plane defined by the X axis and the Z axis is referred to as an X-Z plane. Further, viewing towards the X-Y plane is referred to as planar view. The first direction X and the second direction Y correspond to the directions parallel to a main surface of a substrate included in the liquid crystal element. The third direction Z corresponds to a thickness direction of the liquid crystal element.

FIG. 1 is a cross-sectional view showing an example of a liquid crystal element 10 according to this embodiment.

The liquid crystal element 10 comprises a transparent substrate 11, an alignment film AL11, a liquid crystal layer LC and a protective layer 12. The transparent substrate 11 opposes the protective layer 12 along the third direction Z. The liquid crystal layer LC functions as a reflective polarization grating RPG and is located between the transparent substrate 11 and the protective layer 12.

The transparent substrate 11 and the protective layer 12 are constituted by, for example, a transparent glass plate or a transparent synthetic resin plate. The transparent substrate 11 includes a first main surface 11A. The first main surface 11A is a plane parallel to the X-Y plane.

The alignment film AL11 is disposed on a first main surface 11A of the transparent substrate 11. The alignment film AL11 is a horizontal alignment film formed of, for example, polyimide and having an alignment restriction force along the X-Y plane. Further, the alignment film AL11 is a photo-alignment film or monolayer for forming a spatially varying liquid crystal alignment pattern.

The liquid crystal layer LC is disposed between the alignment film AL11 and the protective layer 12, and is in contact with the alignment film AL11 and the protective layer 12. The liquid crystal layer LC includes a main surface LS. The main surface LS here is, for example, an interface between the liquid crystal layer LC and the alignment film AL11, and is a plane parallel to the X-Y plane.

The liquid crystal layer LC contains a cholesteric liquid crystal (liquid crystal structure) CL. Note, for simplicity, FIG. 1 illustrates one liquid crystal molecule LM1 of a plurality of liquid crystal molecules located in the same plane parallel to the X-Y plane as a liquid crystal molecule LM1 that constitutes the cholesteric liquid crystal CL. The alignment direction of the liquid crystal molecule LM1 is equivalent to the average alignment direction of the liquid crystal molecules located on the same plane.

Focusing on a single cholesteric liquid crystal CL, the cholesteric liquid crystal CL includes a liquid crystal molecule LM11 located at one end and a liquid crystal molecule LM12 located at the other end. The liquid crystal molecule LM11 is in close proximity to the alignment film AL11, and the liquid crystal molecule LM12 is in close proximity to the protective layer 12. A plurality of liquid crystal molecules LM1 including a liquid crystal molecules LM11 and a liquid crystal molecule LM12 are stacked in a spiral shape while pivoting around a helical axis AX to form a cholesteric liquid crystal CL.

The cholesteric liquid crystal CL has a helical pitch P. The helical pitch P is one cycle of the helix (the length along the helical axis AX required for the liquid crystal molecule LM1 to rotate 360 degrees). In the example shown in FIG. 1, the helical axis AX is inclined with respect to the third direction Z, which is the normal direction of the first main surface 11A or the liquid crystal layer LC.

In the liquid crystal layer LC, the cholesteric liquid crystals CL are arranged along the first direction X and along the second direction Y as well. The cholesteric liquid crystals CL adjacent to each other along the first direction X are aligned along different directions. The alignment direction of the of the liquid crystal molecules LM11 arranged along the alignment film AL11 and the alignment direction of the liquid crystal molecules LM12 arranged along the protective layer 12 are continuously changing. Note that in the liquid crystal layer LC, the cholesteric liquid crystals CL adjacent to each other along the second direction Y are aligned along the same direction.

The liquid crystal layer LC includes a plurality of reflective surfaces RS between the alignment film AL11 and the protective layer 12, as indicated by single dotted lines. The reflective surfaces RS are substantially parallel to each other. The reflective surface RS reflects a part of circularly polarized light of the incident light and transmits other part of the circularly polarized light according to Bragg's law. The reflective surfaces RS are equivalent to surfaces where the liquid crystal molecules LM1 are aligned along the same direction, or surfaces whose spatial phases are the same as each other (equiphase surfaces). In the X-Z cross section shown in FIG. 1, the reflective surface RS are inclined with respect to the first main surface 11A or the main surface LS of the liquid crystal layer LC.

The cholesteric liquid crystal CL reflects, of the light having a specific wavelength $\lambda$, circularly polarized light in the same rotating direction as that of the cholesteric liquid crystal CL. For example, if the rotating direction of the cholesteric liquid crystal CL is right-handed, it reflects right-handed circularly polarized light of the light of the specific wavelength $\lambda$ and transmits left-handed circularly polarized light. Similarly, when the rotating direction of the cholesteric liquid crystal CL is left-handed, it reflects left-handed circularly polarized light of the light of the specific wavelength $\lambda$ and transmits right-handed circularly polarized light.

Such a liquid crystal layer LC is hardened in the state that the alignment directions of the liquid crystal molecules LM1 including liquid crystal molecules LM11 and LM12 are fixed. In other words, the alignment direction of the liquid crystal molecules LM1 is not controlled in response to an electric field. Therefore, the liquid crystal element 10 does not include an electrode for controlling the alignment.

In general, the selective reflection band $\Delta\lambda$ of the cholesteric liquid crystal CL for vertically incident light is determined by the helical pitch P of the cholesteric liquid crystal CL, the refractive index ne for extraordinary light and the refractive index no for ordinary light, and it can be expressed as: "no*P to ne*P". Therefore, in order to efficiently reflect circularly polarized light of a specific wavelength $\lambda$ at a reflective surface RS, the helical pitch P, the refractive indexes ne and no are set so that the specific wavelength $\lambda$ is contained in the selective reflection wavelength band $\Delta\lambda$.

Figure 2:
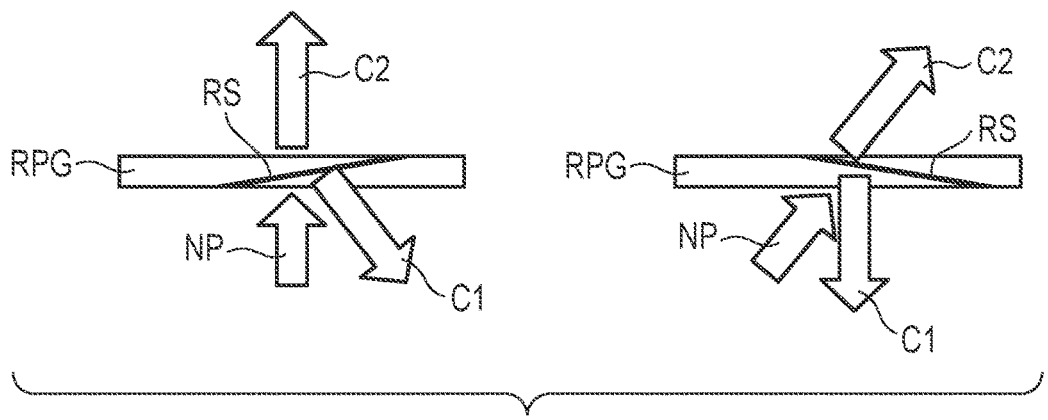
FIG. 2 is a diagram illustrating an optical effect of a reflective polarization grating RPG.

FIG. 2 illustrates the optical action of the reflective polarization grating RPG.

As shown in the left side of FIG. 2, when light NP in a non-polarized state as the incident light is made incident from the normal direction of the polarization grating RPG, the polarization grating RPG reflects first circularly polarized light C1 of the light NP at the reflective surface RS, and transmits second circularly polarized light C2. The first circularly polarized light C1 is reflected in an inclined direction at the inclined reflective surface RS. The second circularly polarized light C2 is transmitted through the reflective surface RS and travels straight in the normal direction of the polarization grating RPG.

As shown in the right side of FIG. 2, when non-polarized light NP as the incident light is made incident on the polarization grating RPG from an inclined direction thereto, the polarization grating RPG reflects first circularly polarized light C1 of the light NP at the reflective surface RS and transmits second circularly polarized light C2. The first circularly polarized light C1 is reflected in the normal direction at the inclined reflective surface RS. The second circularly polarized light C2 is transmitted through the reflective surface RS and travels straight in the inclined direction with respect to the polarization grating RPG.

Several configuration examples will be described below. In each configuration example, the explanation will mainly focus on the significant differences from others, and the same configurations will be denoted by the same reference signs and the explanations thereof may be omitted.

Configuration Example 1

Figure 4:
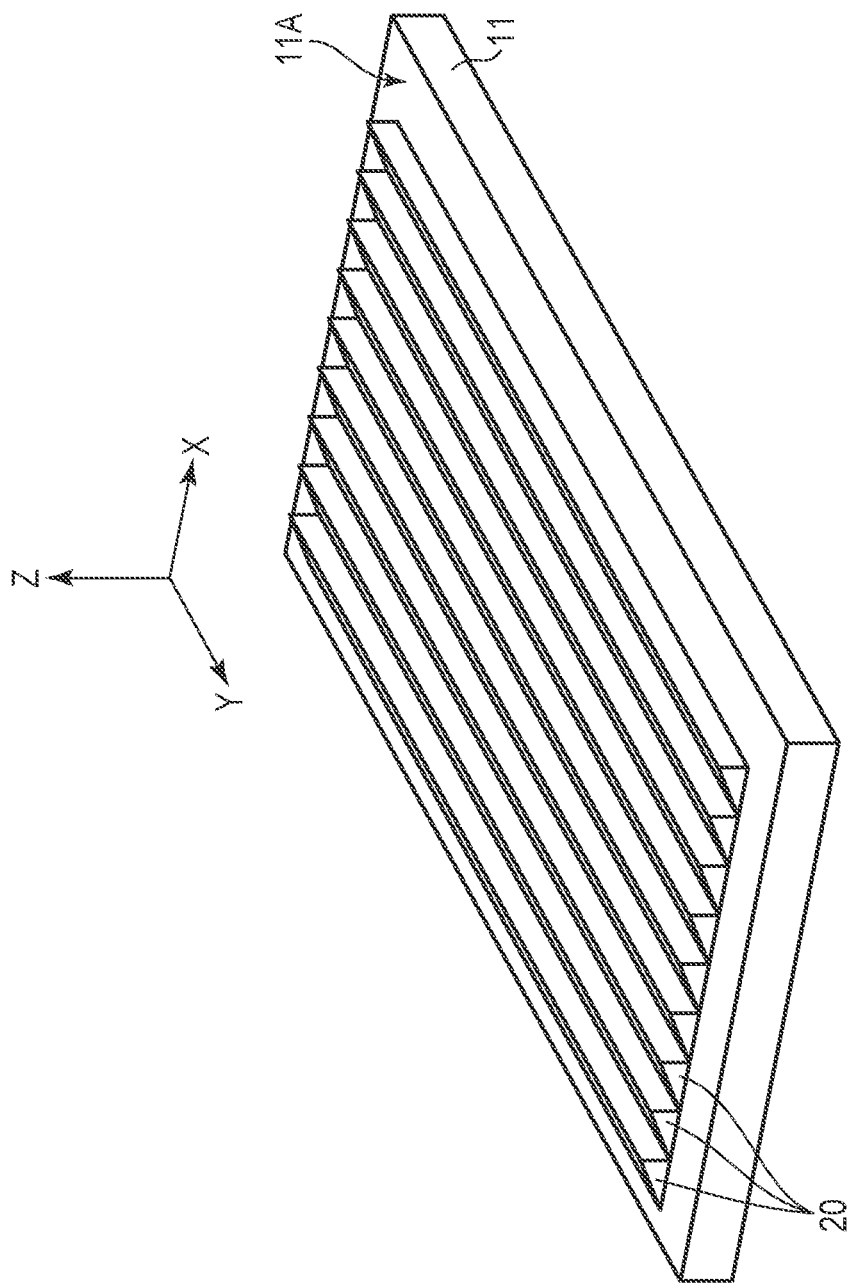
FIG. 4 is a perspective view showing a structure 20 of the liquid crystal element 10 shown in FIG. 3.

FIG. 3 is a cross-sectional view showing an example configuration of a liquid crystal element 10. FIG. 4 is a diagram schematically showing a structure 20 of the liquid crystal element 10 shown in FIG. 3.

The liquid crystal element 10 comprises a plurality of structures 20 arranged on a first main surface 11A of a transparent substrate 11. The structures 20 are arranged at an equal pitch along the first direction X. Each pair of the structures 20, adjacent to each other along the first direction X may be connected to each other or separated from each other. Each of the structures 20 is formed to have a triangular cross-section in the X-Z plane, as a triangular column extending along the second direction Y. Each structure 20 includes a first surface 21 and a second surface 22 that form a surface, and a bottom surface 23 in contact with the transparent substrate 11.

The first surface 21 is inclined to the first main surface 11A. An angle θ1 made between the first surface 21 and the first main surface 11A is an acute angle. The first surfaces 21 of the structures 20 are parallel to each other.

The second surface 22 is a surface located between the first surfaces 21 of pair of structures 20 adjacent to each other along the first direction X. The second surface 22 intersects the respective first surface 21 at an acute angle. The intersection between the first face 21 and the second face 22 extends along the second direction Y and forms a ridge of the respective structure 20, which may be rounded. An angle θ2 made between the first surface 21 and the second surface 22 is an acute angle greater than the angle θ1 (θ1<θ2). Further, the second surface 22 is orthogonal to the respective first main surface 11A. The second surfaces 22 of the structures 20 are parallel to each other.

An alignment film AL11 is disposed on each of the first surface 21 and the second surface 22. In other words, the alignment film AL11 is interposed between the first surface 21 and the liquid crystal layer LC, as well as between the second surface 22 and the liquid crystal layer LC. Of the alignment film AL11, particularly, the portion disposed on the first surface 21 is configured to have an alignment restriction force in a predetermined direction in a plane parallel to the first surface 21.

Of the liquid crystal molecules contained in the cholesteric liquid crystal CL, the liquid crystal molecules LM11 that are in close proximity to the alignment film AL11 are aligned in a predetermined direction in a plane parallel to the first surface 21 by the alignment restriction force of the alignment film AL11. In the example illustrated in the figure, the liquid crystal molecules LM11 are aligned such that their longitudinal axes are set along the first plane 21 in the X-Z plane, but they may as well be aligned such that their longitudinal axes are along the second direction Y.

The helical axis AX of the cholesteric liquid crystal CL is substantially parallel to a normal line 21N of the first surface 21. The helical axis AX and the normal line 21N are inclined with respect to the first main surface 11A. The angle made between the first main surface 11A and the helical axis AX (or the angle between the first main surface 11A and the normal line 21N), that is, θα is an acute angle, which is, in this case, equivalent to the angle θ2. From the cholesteric liquid crystal CL having such a configuration, the reflective surface RS inclined to the first main surface 11A is formed.

The structure 20 described above is formed, for example, from a transparent resin material, but it may as well be formed of glass. The structure 20 may be formed of the same material as that of the transparent substrate 11, or may be made of a different material from that of the transparent substrate 11. But, note that the refractive index of the structure 20 is equivalent to the refractive index of the transparent substrate 11 and to that of the liquid crystal layer LC as well. The refractive index of the liquid crystal layer LC is equivalent to the root mean square (RMS) of the ordinary light refractive index no and the extraordinary light refractive index ne. The expression "equivalent" here means that the difference in refractive index is less than 0.2, and preferably the difference in refractive index is less than 0.1. With the above-defined relationship in refractive index, undesirable diffraction or reflection between the structure 20 and the transparent substrate 11 can be suppressed, and further, undesirable diffraction or reflection between the structure 20 and the liquid crystal layer LC as well can be suppressed.

For example, the structure 20 can be formed using so-called nanoimprint technology. As a material to form the structure 20 of such a feature, a thermosetting resin or light-curing resin that reacts to light such as ultraviolet light can be applied.

Here, an example of the dimensions of the structure 20 will be described. The right side of the figure shows an enlarged view of the structure 20. Let us refer to the length of the bottom surface 23 along the first direction X of the structure 20 (or the pitch of the structure 20), as L, and the height of the structure 20 along the third direction Z, as H. In this case, the relationship: $\tan \theta_1 = H/L$ is established. Further, let us assume that the liquid crystal molecules are arranged along the normal direction of the first surface 21 over a distance equivalent to an integral multiple of the half pitch P/2 of the helix. Then, the relationship: $H * \cos \theta_1 \approx m * P/2$ is established, where m is an integer.

When these relationship formulas are rearranged, the length L is set to satisfy $L \approx m * P/(2 * \sin \theta_1)$. Further, the height H is set to satisfy $H \approx m * P/(2 * \cos \theta_1) = L * \tan \theta_1$.

The length of the cholesteric liquid crystal CL along the helical axis AX is expressed as P*N, where N is an integer. From the viewpoint of obtaining a preferable reflectance in the cholesteric liquid crystal CL, N should be 4 or more. Note that if N is 10 or more, the reflectance tends to be substantially saturated.

For example, when the helical pitch P is 500 nm, the length of the cholesteric liquid crystal CL is at least 2 μm to 5 μm or more. In such a case, it is preferable that the height H of the structure 20 be less than the length of the cholesteric liquid crystal CL, for example, 5 μm or less. Note that the length L of the structure 20 is determined based on the inclination angle of the first surface 21, θ1, and the height H. When θ1 is 20 degrees and the height H is 5 μm, the length L is 13.7 μm.

An example of the method of manufacturing the liquid crystal element 10 will now be briefly described.

First, the material (for example, UV curable resin) for forming the structure 20 is applied onto the first main surface 11A of the transparent substrate 11 and remove the solvent to form a temporarily cured state of the material.

Then, a mold with a recess formed beforehand according to the shape of the structure 20 is placed on the material in the temporarily cured state, and UV light is irradiated thereon while applying pressure. Thus, the material is cured into the shape corresponding to the recesses of the mold, and the structure 20 is formed. After that, the mold is removed.

Subsequently, a liquid crystal material containing a chiral agent added thereto is applied to be brought into contact with the structure 20. At this time, the alignment direction of the liquid crystal molecules contained in the liquid crystal material is fixed in the following manner. That is, the liquid crystal molecules LM11 in close proximity to the first surface 21 are aligned along a predetermined direction according to the alignment restriction force of the alignment film AL11. Here, the cholesteric liquid crystal CL can be regarded as a continuum in which multiple liquid crystal molecules including the liquid crystal molecules LM11 are arranged. With this structure, the alignment direction of the liquid crystal molecules LM11 is defined by the structure 20, and thus the other liquid crystal molecules LM1 are aligned so as to rotate around the helical axis AX. Thus, a cholesteric liquid crystal CL with the helical axis AX inclined in accordance with the inclination of the structure 20 can be obtained. After that, the liquid crystal material is cured by irradiating light such as UV light thereonto to form the liquid crystal layer LC.

Then, a protective layer 12 is placed on the liquid crystal layer LC, and thus the liquid crystal element 10 is manufactured.

According to the first configuration example discussed above, the structure 20 with a micro structure can be easily formed using a mold with micro-irregularities of the wavelength order. The structure 20 with such a structure has the function of defining the alignment direction of the liquid crystal molecules contained in the liquid crystal material when the liquid crystal material is applied thereon. The pattern of the structure 20 is formed in such a way as to obtain a cholesteric liquid crystal CL having a helical axis AX inclined at a desired angle. Thus, a liquid crystal element 10 having a reflective surface RS inclined at a desired angle can be obtained. As described, compared to the case where the circularly polarized light interference exposure method is applied, the liquid crystal element 10 can be obtained more easily, making it possible to achieve a larger area and mass production.

Configuration Example 2

Figure 5:
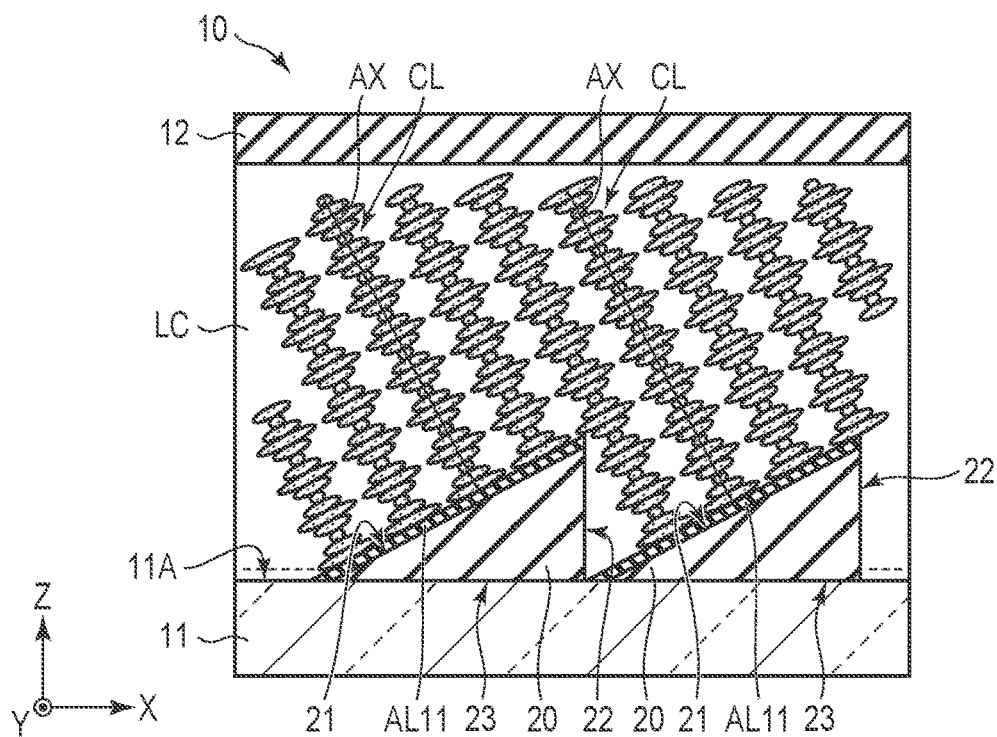
FIG. 5 is a cross-sectional view showing another configuration example of the liquid crystal element 10.

FIG. 5 is a cross-sectional view of another configuration example of the liquid crystal element 10.

The example shown in FIG. 5 is different from that of FIG. 3 in that the alignment film AL11 is not placed on the second surface 22. In other words, the liquid crystal layer LC is in contact with the second surface 22.

The alignment film AL11 with such a structure can be formed by applying an oblique evaporation method in which the material is deposited, for example, from an oblique direction to the normal (the third direction Z) of the transparent substrate 11. For example, a vapor deposition source is placed at the upper left section of the figure, and the alignment film material is deposited. Thus, the alignment film material is deposited onto the first surface 21 of the structure 20, which opposes the vapor deposition source, but not onto the second surface 22, thus obtaining the alignment film AL11 with such a configuration as shown in the figure.

Alternatively, after covering the entire surface of the structure 20 with the alignment film material, the portion of the alignment film material which covers the second surface 22 may be removed to obtain the alignment film AL11 as shown in the figure.

In the configuration example 2 with such a configuration as well, advantageous effects similar to those of the configuration example 1 provided above can be obtained. In addition, since there is no alignment film covering the second surface 22, the process of forming the liquid crystal layer LC is not affected by the alignment restriction force of the alignment film covering the second surface 22, and therefore the cholesteric liquid crystal CL aligned in the desired direction can be obtained.

Configuration Example 3

Figure 6:
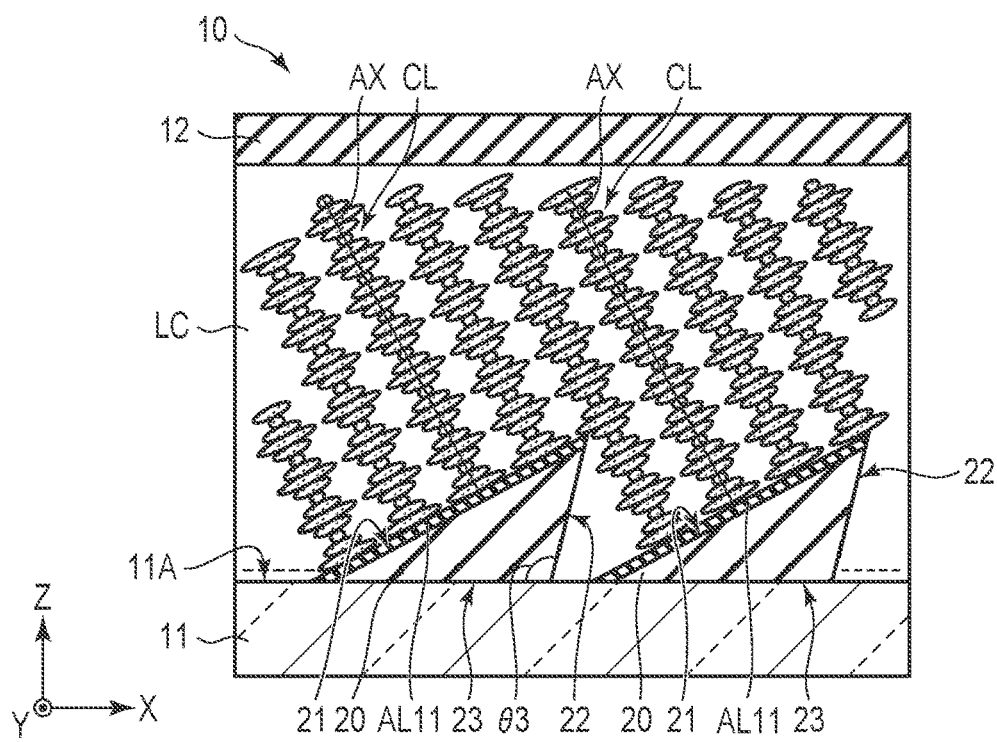
FIG. 6 is a cross-sectional view showing still another configuration example of the liquid crystal element 10.

FIG. 6 is a cross-sectional view of another configuration example of liquid crystal element 10.

The example shown in FIG. 6 is different from that of FIG. 5 in that the second surface 22 is inclined with respect to the first main surface 11A (or the bottom surface 23). The angle 193 made between the second surface 22 and the first main surface 11A is an obtuse angle. The second surfaces 22 of the structures 20 are parallel to each other.

In the example shown in FIG. 6, the alignment film AL11 is not disposed on the second surface 22. Therefore, the liquid crystal layer LC is in contact with the second surface 22. But, as in the example shown in FIG. 3, the alignment film AL11 may be placed on the second surface 22.

In the configuration example 3 with such a configuration as well, advantageous effects similar to those discussed above can be obtained.

Configuration Example 4

Figure 7:
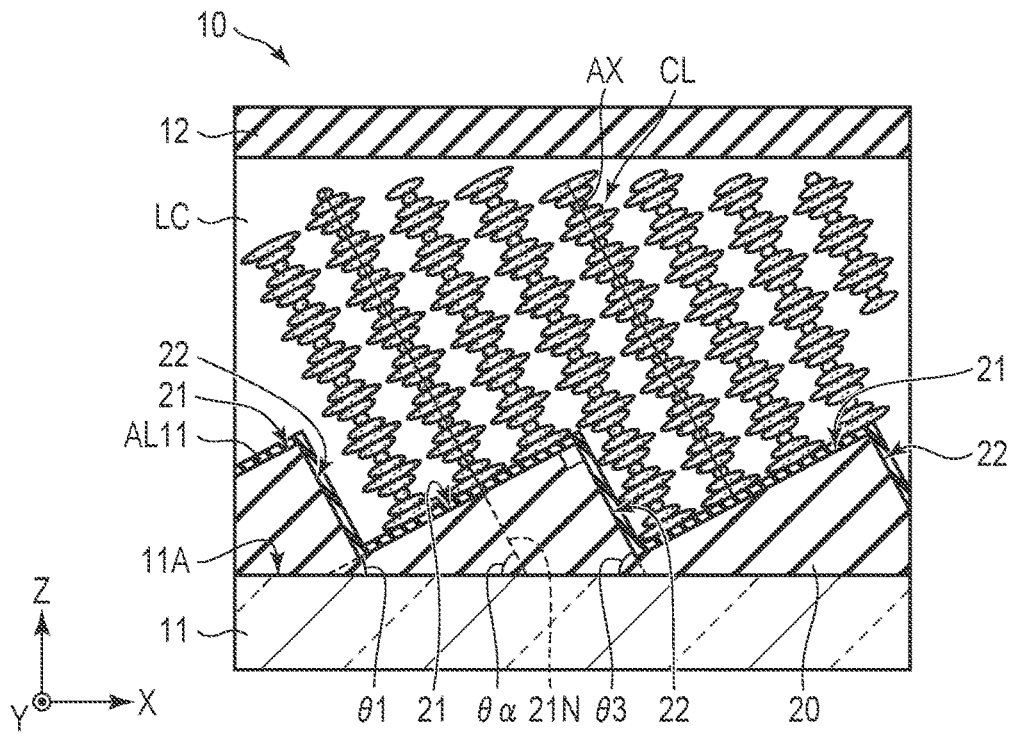
FIG. 7 is a cross-sectional view showing still another configuration example of the liquid crystal element 10.

FIG. 7 is a cross-sectional view of another configuration example of the liquid crystal element 10.

The example shown in FIG. 7 is different from that of FIG. 3 in the shape of the structures 20. The structures 20 are arranged at an equal pitch along the first direction X. In the example illustrated, each pair of the structures 20, which are adjacent to each other along the first direction X are connected to each other, but they may be separated from each other.

The first surface 21 is inclined with respect to the first main surface 11A. The angle θ1 made between the first surface 21 and the first main surface 11A is an acute angle. The first surfaces 21 of the structures 20 are parallel to each other.

The second surface 22 is a surface located between the first surfaces 21 of each pair of structures 20 adjacent to each other along the first direction X. The second surface 22 is orthogonal to the respective first surface 21. The intersection between the first surface 21 and the second surface 22 extends along the second direction Y and forms a ridge of the respective structure 20, which may be rounded. Further, the second surface 22 is inclined with respect to the first main surface 11A. The angle θ3 made between the second surface 22 and the first main surface 11A is an acute angle. The inclination angle θ1 of the first surface 21 with respect to the first main surface 11A is less than the inclination angle θ3 of the second surface 22 with respect to the first main surface 11A (θ1<θ3). The second surfaces 22 of the structures 20 are parallel to each other.

The alignment film AL11 is disposed on each of the first surfaces 21 and the second surfaces 22. In other words, the alignment film AL11 is interposed between each first surface 21 and the liquid crystal layer LC, and between each second surface 22 and the liquid crystal layer LC as well. Of the alignment film AL11, particularly, the portion disposed on the first surfaces 21 is configured to have an alignment restriction force in a predetermined direction in a plane parallel to the first surface 21.

The helical axis AX of the cholesteric liquid crystal CL is substantially parallel to the normal line 21N of the first surface 21. The helical axis AX and the normal line 21N are inclined with respect to the first main surface 11A. The angle made between the first main surface 11A and the helical axis AX (or the angle between the first main surface 11A and the normal line 21N), θα is an acute angle, which is equivalent to the angle θ3 here.

In the configuration example 4 with such a configuration as well, advantageous effects similar to those of the configuration example 1 provided above can be obtained.

Configuration Example 5

Figure 8:
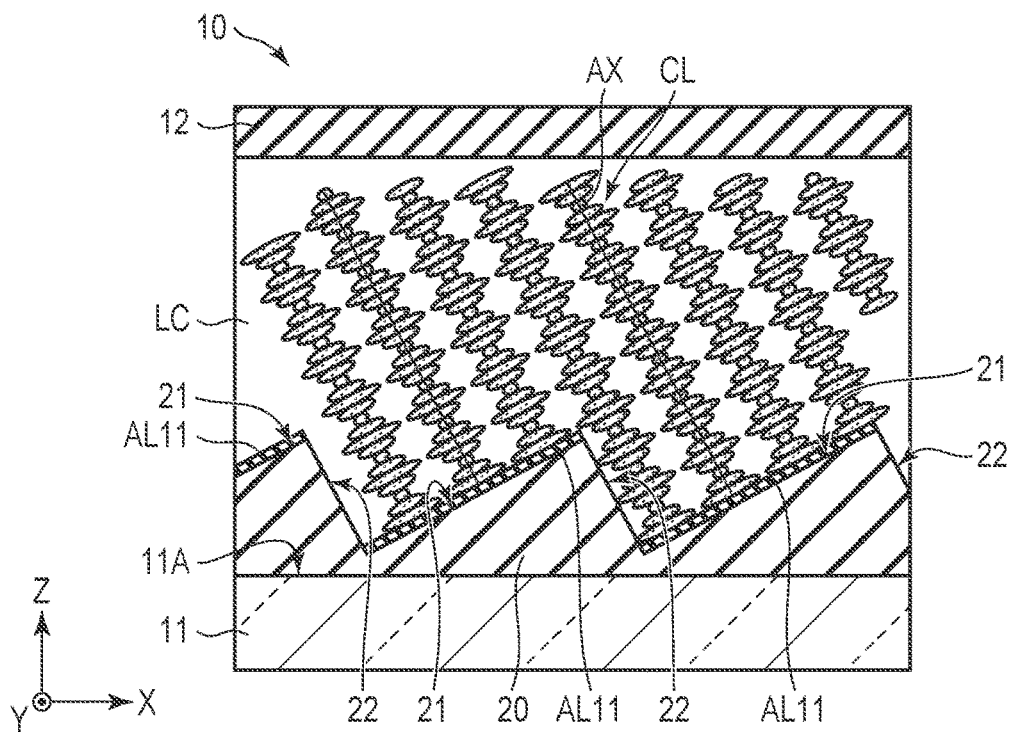
FIG. 8 is a cross-sectional view showing still another configuration example of the liquid crystal element 10.

FIG. 8 is a cross-sectional view of another configuration example of liquid crystal element 10.

The example shown in FIG. 8 is different from that of FIG. 7 in that the alignment film AL11 is not placed on the second surfaces 2. In other words, the liquid crystal layer LC is in contact with the second surfaces 22.

The method of manufacturing the alignment film AL11 with such configuration is as described in configuration example 2 provided above.

In the configuration example 5 with such a configuration as well, advantageous effects similar to those of the configuration example 2 provided above can be obtained.

Configuration Example 6

Figure 9:
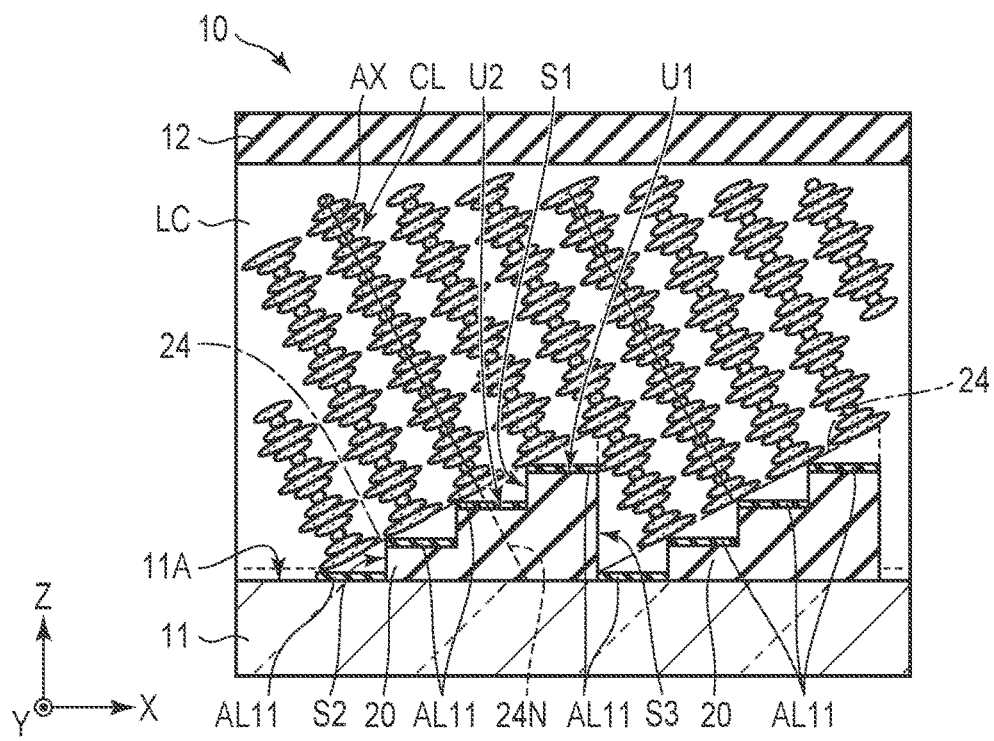
FIG. 9 is a cross-sectional view showing still another configuration example of the liquid crystal element 10.

FIG. 9 is a cross-sectional view of another configuration example of liquid crystal element 10.

The example shown in FIG. 9 is different from those provided above in that the surface of each structure 20 is formed into a staircase shape. The structures 20 are arranged at an equal pitch along the first direction X. Each pair of structures 20 adjacent to each other along the first direction X are separated in the example illustrated.

That is, the surface of each structure 20 include a plurality of upper surfaces including a first upper surface U1 and a second upper surface U2, and a plurality of side surfaces including side surfaces S1 to S3. Each of the upper surfaces is substantially parallel to the X-Y plane. Each of the side surfaces is substantially parallel to the Y-Z plane.

With reference to the first main surface 11A, the height to the second upper surface U2 is different from the height to the first upper surface U1. In the illustrated example, the position of the first upper surface U1 is higher than that of the second upper surface U2.

The side surface S1 is located between the first upper surface U1 and the second upper surface U2, and connects one end of the first upper surface U1 and the other end of the second upper surface U2 to each other. The side surface S2 is located at one end side of the structure 20 along the first direction X, and the side surface S3 is located on the other end side of the structure 20 along the first direction X. In FIG. 9, the rear end side of the arrow indicating the first direction X (the left side of the figure) is referred to as the "one end side", and the distal end side of the arrow indicating the first direction X (the right side of the figure) is referred to as the "other end side".

The alignment film AL11 is disposed on each of the upper surfaces including the first upper surface U1 and the second upper surface U2. That is, the alignment film AL11 is interposed between each upper surface and the liquid crystal layer LC. On the other hand, the alignment film AL11 is not disposed on the side surfaces. In other words, the liquid crystal layer LC is in contact with each side surface of the structures 20. The alignment film AL11 is disposed on the first main surface 11A between each adjacent pair of the structures 20, as well.

The plane 24 connecting one end of the first upper surface U1 and one end of the respective second upper surface U2 is indicated by a single dot line in the figure. The helical axis AX of the cholesteric liquid crystal CL is substantially parallel to the normal line 24N to the plane 24. The helical axis AX and the normal line 24N are inclined with respect to the first main surface 11A.

In the configuration example 6 with such a configuration as well, advantageous effects similar to those of the configuration example 1 provided above can be obtained.

Configuration Example 7

Figure 10:
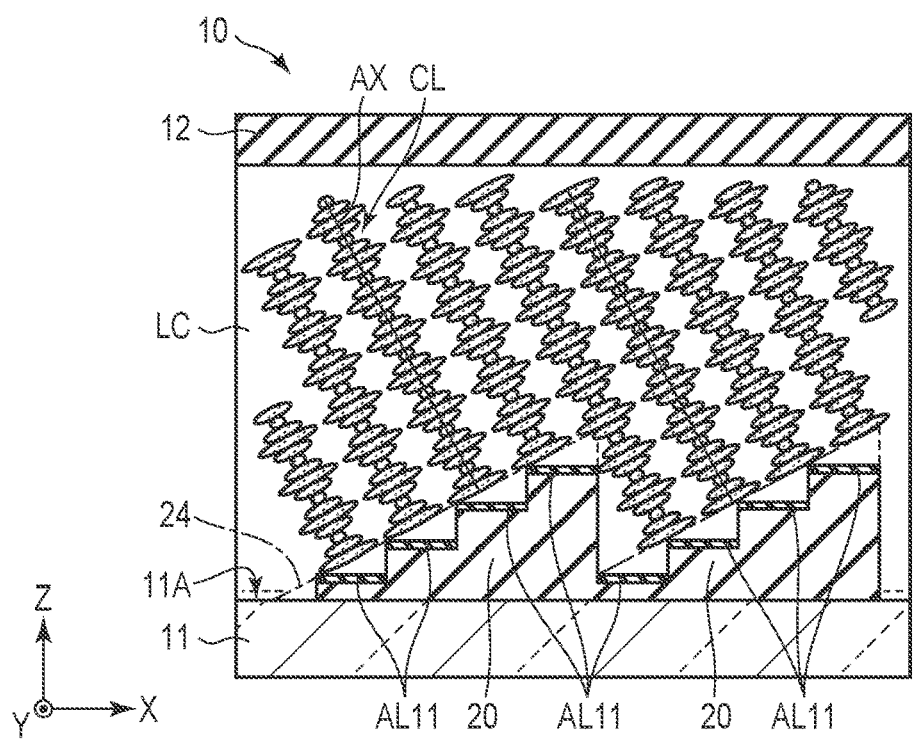
FIG. 10 is a cross-sectional view showing still another configuration example of the liquid crystal element 10.

FIG. 10 is a cross-sectional view showing another configuration example of the liquid crystal element 10.

The example shown in FIG. 10 is different from that of FIG. 9 in that each pair of structures 20 adjacent to each other along the first direction X are connected to each other.

In the configuration example 7 with such a configuration as well, advantageous effects similar to those of the examples provided above can be obtained.

Note that in each of the configuration examples shown in FIGS. 9 and 10, the number of upper surfaces of each structure 20 is not limited to that shown in the examples illustrated. The width of each upper surface along the first direction X and the height each side surface along the third direction Z should preferable be constant, but they should be set appropriately so that the virtual plane 24 becomes a flat plane.

Next, several examples will be described. In each example, the shape of the structures 20 is not described in detail, but any of the configuration examples 1 through 7 provided above can be applied.

Example 1

FIG. 11 is a cross-sectional view of Example 1 of the liquid crystal element 10.

The liquid crystal element 10 comprises a transparent substrate 11, structures 20, a liquid crystal layer LC containing a cholesteric liquid crystal, a protective layer 12, a protective layer 13, and a photo-receiver 30.

The transparent substrate 11 includes a first main surface 11A, a second main surface 11B on an opposite side to the first main surface 11A, and a side surface 11C. As described above, the structures 20 are disposed on the first main surface 11A. The liquid crystal layer LC is disposed in contact with the structures 20. The protective layer 12 covers the liquid crystal layer LC. The protective layer 13 is disposed on the second main surface 11B. The refractive index of the protective layer 13 is lower than that of the transparent substrate 11. Note that the protective layer 13 may be omitted. The photo-receiver 30 is disposed so as to oppose the side surface 11C.

Here, let us consider the case where light NP in a non-polarized state is made incident as incident light from the normal direction of the liquid crystal element 10. The light NP passes through the protective layer 13 and the transparent substrate 11 and enters the liquid crystal layer LC. The reflective surfaces RS formed in the liquid crystal layer LC reflect first circularly polarized light C1 of a specific wavelength λ of the light NP, and transmits second circularly polarized light C2 which rotates in an opposite direction from that of the first circularly polarized light C1.

Note that, of the light NP, light with a wavelength different from the specific wavelength λ is also transmitted through the reflective surfaces RS.

The first circularly polarized light C1 reflected by the reflective surfaces RS is made incident on the transparent substrate 11 again. At this time, the inclined angle of the reflective surfaces RS is set such that the reflected first circularly polarized light C1 is totally reflected at the interface between the transparent substrate 11 and the protective layer 13. Therefore, the first circularly polarized light C1 entered the transparent substrate 11 propagates while reflecting inside the substrate 11 and is transmitted through the side surface 11C. The photo-receiver 30 receives the first circularly polarized light C1 transmitted through the side surface 11C, and converts the energy of the received light into electric power. This type of liquid crystal element 10 can be used as a power generation device.

Example 2

FIG. 12 is a cross-sectional view showing Example 2 of the liquid crystal element 10.

The liquid crystal element 10 comprises a transparent substrate 11, structures 20, a liquid crystal layer LC containing a cholesteric liquid crystal, a transparent substrate 14, a protective layer 15 and a photo-receiver 30.

The transparent substrate 14 includes a main surface 14A, a main surface 14B on an opposite side to the main surface 14A and a side surface 14C. The liquid crystal layer LC is disposed on the main surface 14A. The protective layer 15 is disposed on the main surface 14B. The refractive index of the protective layer 15 is lower than that of the transparent substrate 14. Note that the protective layer 15 may be omitted. The photo-receiver 30 is disposed so as to oppose the side surface 14C.

Here, when light NP in a non-polarized state is made incident as incident light from the normal direction of the liquid crystal element 10, the light NP passes through the protective layer 15 and the transparent substrate 14, and enters the liquid crystal layer LC. The reflective surfaces RS formed in the liquid crystal layer LC reflect the first circularly polarized light of a specific wavelength λ of the light NP, and transmits the second circularly polarized light C2 which rotate in an opposite direction from that of the first circularly polarized light C1.

The first circularly polarized light C1 reflected by the reflective surfaces RS is made incident on the transparent substrate 14 again. At this time, the inclined angle of the reflective surfaces RS is set so that the reflected first circularly polarized light C1 is totally reflected at the interface between the transparent substrate 14 and the protective layer 15. Therefore, the first circularly polarized light C1 entered the transparent substrate 14 propagates while reflecting inside the transparent substrate 14 and is transmitted through the side surface 14C. The photo-receiver 30 receives the first circularly polarized light C1 transmitted through the side surface 14C, and converts the energy of the received light into electric power. This type of liquid crystal element 10 can be used as a power generation device.

Example 3

FIG. 13 is a cross-sectional view showing Example 3 of the liquid crystal element 10.

The liquid crystal element 10 comprises a transparent substrate 11, structures 20, a liquid crystal layer LC containing a cholesteric liquid crystal and a protective layer 12.

Here, when light NP in a non-polarized state as incident light is made incident from the normal direction of the liquid crystal element 10, the light NP passes through the protective layer 12 and enters the liquid crystal layer LC. The reflective surfaces RS formed in the liquid crystal layer LC reflect the first circularly polarized light of a specific wavelength λ of the light NP, and transmits the second circularly polarized light C2 which rotate in an opposite direction from that of the first circularly polarized light C1. This type of liquid crystal element 10 can be used as a reflective optical element.

Each of the examples provided above is described in connection with the case where the reflective surfaces RS formed in the liquid crystal layer LC are substantially flat planes, but the embodiments are not limited to such a case. For example, by devising the shape and arrangement of the structures 20, curved reflective surfaces RS can be formed.

FIG. 14 is a cross-sectional view showing another example of the liquid crystal element 10. FIG. 15 is a schematic diagram showing structures 20 of the liquid crystal element 10 shown in FIG. 14.

The structures 20 are arranged along the first direction X. Each of those structures 20 formed on the right side of the figure with respect to a center line LN of the transparent substrate 11 is linearly symmetrical with each respective one of those structures 20 formed on the left side of the figure with respect to the center line LN. For example, focusing on those structures 20 on the right half, the length of the structure 20 along the first direction X decrease as the location of that structure 20 is farther away from the center line LN. Note, however, that the structures 20 has a substantially constant height H along the third direction Z. With this configuration, the inclination angle θ1 of the first surface 21 of the structure 20 gradually increases as the location of that structure 20 is farther away from the center line LN.

The helical axis of the cholesteric liquid crystal contained in the liquid crystal layer LC is aligned in a predetermined direction according to the shapes of these structures 20. With this configuration, a curved reflective surface RS as shown in FIG. 14 with a single dotted line is formed. Since each of the structures 20 is formed into a triangular prism shape extending along the second direction Y, the reflective surface RS is formed as a cylindrical shape extending along the second direction Y.

As described above, in order to form a reflective surface RS of a target shape, it is not necessary that the first surface 21 of each of the structures 20 faces the same direction, but structures 20 facing multiple directions may be arranged in combination.

As explained above, according to the present embodiments, it is possible to provide a liquid crystal element that can be enlarged to a large area and mass-produced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A liquid crystal element comprising:
a transparent substrate including a first main surface;

a plurality of structures disposed on the first main surface and arranged along one direction;

an alignment film disposed on a surface of each of the structures; and a liquid crystal layer containing a cholesteric liquid crystal and in contact with the alignment film, a helical axis of the cholesteric liquid crystal being inclined with respect to the first main surface, the surface of each of the structures being formed into a form of a staircase, including a first upper surface, a second upper surface of a different height from that of the first upper surface, and a side surface between the first upper surface and the second upper surface, and the alignment film being interposed between the first upper surface and the liquid crystal layer and between the second upper surface and the liquid crystal layer.

2. The liquid crystal element of claim 1, wherein the side surface connects one end of the first upper surface to other end of the second upper surface, and the helical axis is substantially parallel to a normal line to a plane connecting one end of the first upper surface and one end of the second upper surface.

3. The liquid crystal element of claim 1, wherein the liquid crystal layer is in contact with the side surface.

4. The liquid crystal element of claim 1, wherein a refractive index of the structures is equivalent to a refractive index of the transparent substrate and a refractive index of the liquid crystal layer.

5. The liquid crystal element of claim 1, wherein a height of the structures is 5 μm or less.

* * * * *